United States Patent
Ishikawa

(10) Patent No.: US 6,606,449 B1
(45) Date of Patent: Aug. 12, 2003

(54) INFORMATION RECORDING AND PLAYING BACK SYSTEM AND METHOD THEREOF

(75) Inventor: Jun Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/452,190

(22) Filed: Dec. 2, 1999

(30) Foreign Application Priority Data

Dec. 3, 1998 (JP) .......................................... 10-343846

(51) Int. Cl.[7] ................................................ H04N 5/93
(52) U.S. Cl. .......................................... 386/52; 360/13
(58) Field of Search ........................ 386/4, 46, 52–64, 386/95, 125; 360/13, 15; 369/83–85

(56) References Cited

U.S. PATENT DOCUMENTS

| | | | | |
|---|---|---|---|---|
| 5,539,527 A | * | 7/1996 | Kajimoto et al. | 386/52 |
| 5,956,452 A | * | 9/1999 | Oketa et al. | 386/46 |
| 6,336,002 B1 | * | 1/2002 | Yamauchi et al. | 386/95 |
| 6,389,223 B1 | * | 5/2002 | Aotake | 386/125 |

FOREIGN PATENT DOCUMENTS

| JP | 5-75962 | 3/1993 |
|---|---|---|
| JP | 7-312020 | 11/1995 |
| JP | 8-154232 | 6/1996 |
| JP | 9-121368 | 5/1997 |

* cited by examiner

Primary Examiner—Thai Tran
Assistant Examiner—Christopher Onuaku
(74) Attorney, Agent, or Firm—Foley & Lardner

(57) ABSTRACT

An information recording and playing back system and method thereof, in which a dubbing can be performed during a normal recording and playing back state without a user recognizes a transferring rate that changes in a recording and playing back state of recording and playing back apparatuses, are provided. The information recording and playing back system provides a first recording and playing back apparatus that can record audio sounds and video images (AV) information from tuners and can play back recorded AV information for external output terminals and a second recording and playing back apparatus being a low speed apparatus such as a DVD-RAM, and performs a dubbing of AV information from the first recording and playing back apparatus to the second recording and playing back apparatus. The system further provides a comparator that compares usable transferring rates of the first and second recording and playing back apparatuses and outputs a slower transferring rate. The dubbing of the AV information is performed by controlling a transferring speed of the AV information corresponding to the slower transferring rate.

12 Claims, 5 Drawing Sheets

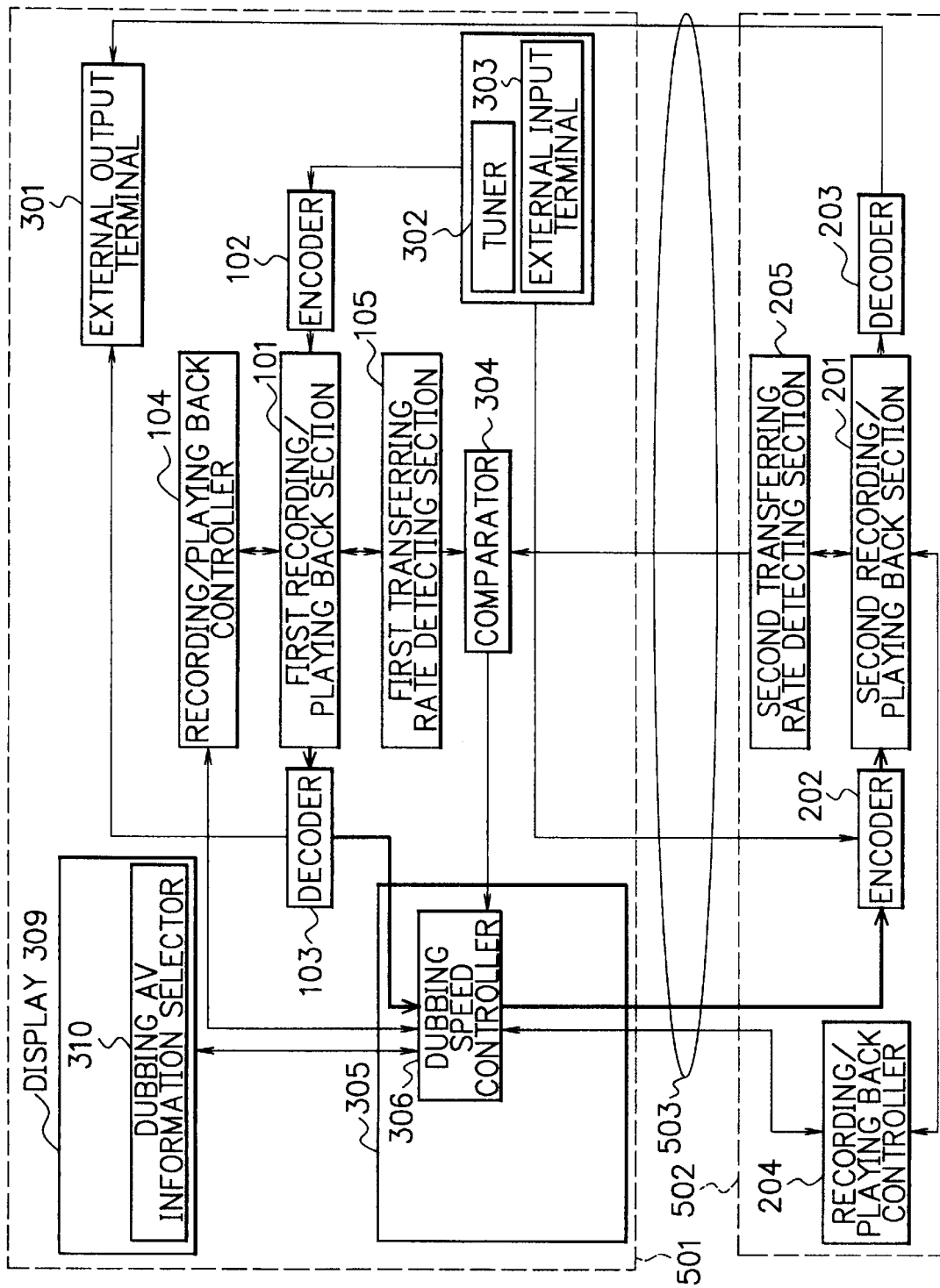
F I G. 2

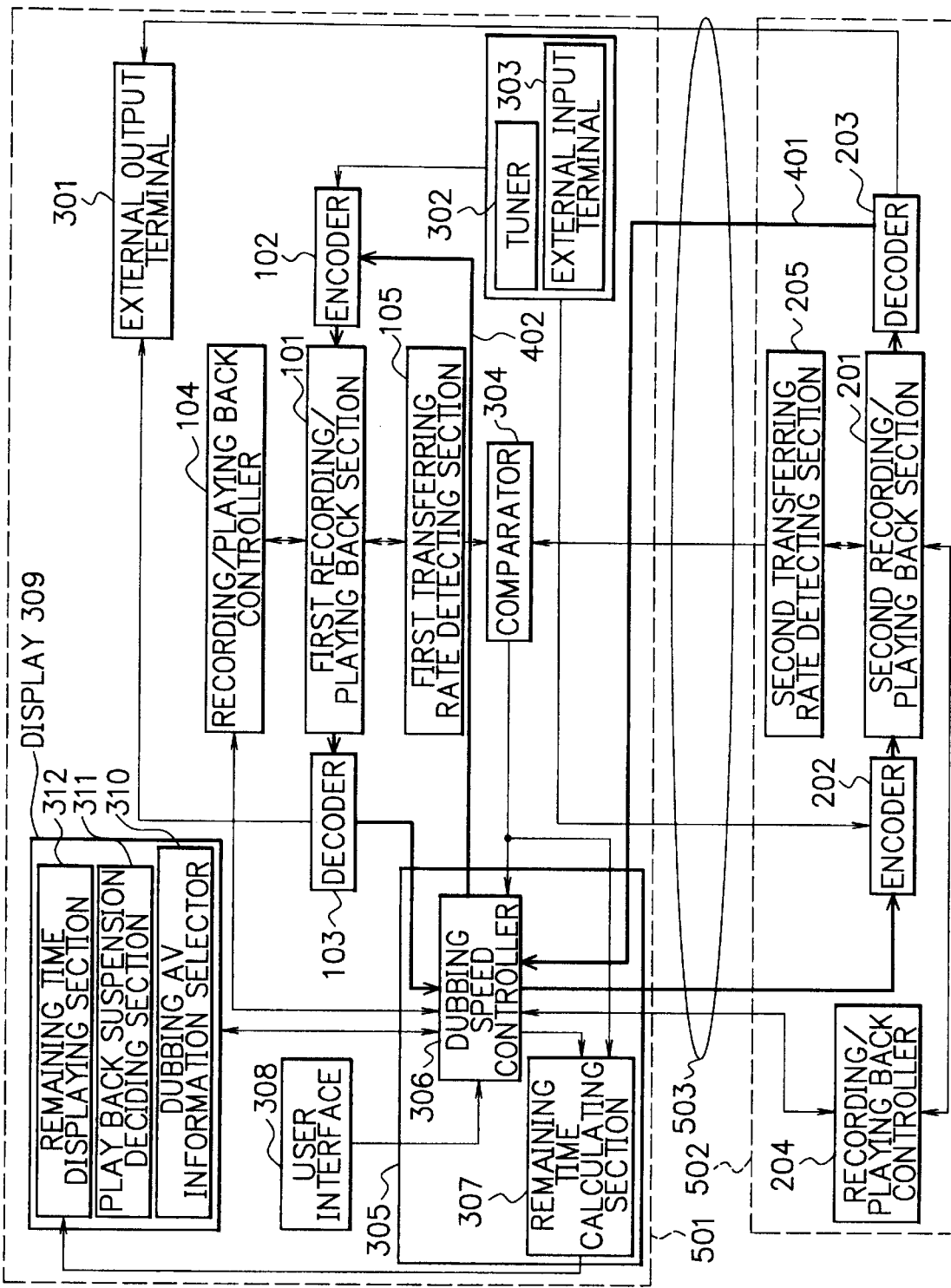

INFORMATION RECORDING AND PLAYING BACK SYSTEM AND METHOD THEREOF

BACKGROUND OF THE INVENTION

The present invention relates to an information recording and playing back system and method thereof, which provides a first recording and playing back apparatus such as a hard disk (HD) being a high speed apparatus that records audio sounds and video images (hereinafter referred to as AV information) of plural channels from tuners and can play back the recorded AV information of plural channels to external output terminals at the same time, and further provides a dubbing function that designated AV information is dubbed from the first recording and playing back apparatus to a second recording and playing back apparatus such as a digital video disk (DVD)-RAM being a low speed apparatus.

DESCRIPTION OF THE RELATED ART

Recently, an information recording and playing back apparatus used a HD being a high speed apparatus as recording media has been developed against a video cassette recorder (VCR) of such as a VHS system using tapes as recording media. At this information recording and playing back apparatus, a transferring rate of recording media is very high, therefore a few to dozens of channels of the AV information of, for example, a moving picture experts group (MPEG) 2 of about 6 megabits per second can be recorded and played back at the same time. Therefore, in case that AV information is dubbed from the information recording and playing back apparatus used HD to another information recording and playing back apparatus, which is built-in at the same apparatus or an external apparatus, a recording and playing back apparatus being high convenient for users being fully different from conventional dubbing can be provided. In this, another information recording and playing back apparatus is used for storage like a library, therefore, this apparatus is a DVD-RAM or a conventional VCR being low transferring rate. However, at the dubbing by the conventional recording tape type VCR, the AV information is dubbed in one apparatus to one apparatus. Consequently, the high performance of this new information recording and playing back apparatus can not be fully utilized.

Japanese Patent Application Laid-Open No. HEI 9-121368 discloses a recording and playing back apparatus, in which NTSC or PAL system being broadcasting system is detected, and the system is automatically set at dubbing operation and the operation performance for users is improved.

And Japanese Patent Application Laid-Open No. HEI 7-312020 discloses a recording and playing back apparatus, in which a disk playing back section and a magnetic recording playing back section are provided in an apparatus, and one touch dubbing function, in which playing back signals of audio sounds and video images in the disk playing back section can be recorded at the magnetic recording playing back section by switching on one button, is provided.

Further, Japanese Patent Application Laid-Open No. HEI 5-75962 discloses a audio and video signals recording and playing back apparatus. This apparatus can output signals except a recording signal even during recording, and can also output playing back signals and the other signals at the same time even during playing back, by controlling switches. That is, the other images can be watched even during recording or dubbing. FIG. 1 is a block diagram showing a conventional apparatus. As shown in FIG. 1, for example, when AV information from an external input terminal 12 is dubbed at a recording/playing back section 22 by connecting the external input terminal 12 and the recording/playing back section 22 by a switch 31, a user can watch a broadcasting program obtained from a tuner 21 by connecting an external output terminal 14 and the tuner 21 by switching on switches 32 and 33. However, at this time the recording/playing back section 22 is used only for dubbing.

As mentioned above, in conventional technologies including mentioned above three technologies regarding dubbing, at the AV information processing such as dubbing, an apparatus outputting AV data and an apparatus recording the data handle only one channel information, therefore both apparatuses for playing back and recording are occupied by transferring the AV information. Consequently, there is a problem that a multi channel simultaneous recording and playing back apparatus, which can record and play back the other AV information while AV information for dubbing is made to be playing back and outputting, can not fulfill its performance.

SUMMARY OF THE INVENTION

It is therefore an object of the present invention to provide an information recording and playing back system and an method thereof, when designated AV information is dubbed from a first recording and playing back apparatus to a second recording and playing back apparatus, in which the second recording and playing back apparatus can perform dubbing while the first recording and playing back apparatus is continuing its normal recording and playing back state, without that a user does not consider a transferring rate that changes corresponding to a recording and playing back state of the first recording and playing back apparatus. In this, the first recording and playing back apparatus, such as a hard disk (HD) is a high speed apparatus that can record audio sounds and video images (AV information) of plural channels from tuners and can play back the recorded AV information of plural channels to external output terminals at the same time. And the second recording and playing back apparatus such as a DVD-RAM is a low speed apparatus.

According to the present invention, an information recording and playing back system, which provides a first recording and playing back apparatus that can records and play back audio and video (AV) information of plural channels at the same time and a second recording and playing back apparatus, which is built-in or set outside said system, can record and play back said AV information from said first recording and playing back apparatus, can perform dubbing of required AV information from said first recording and playing back apparatus to said second recording and playing back apparatus, comprises a first transferring rate detecting means for detecting a usable transferring rate of said first recording and playing back apparatus, a second transferring rate detecting means for detecting a usable transferring rate of said second recording and playing back apparatus, and a comparator that compares detected two transferring rates and outputs a slower transferring rate, and said dubbing of AV information is performed corresponding to said slower transferring rate.

In this constitution, the dubbing operation is performed corresponding to the slower transferring rate in the transferring rates of the first recording and playing back apparatus whose transferring rate changes in the normal recording and playing back operation and the second recording and playing back apparatus, that is, the dubbing operation is performed at a transferring rate as fast as possible. And even at the cases that a playing back request occurs during the dubbing and a recording reserved beforehand is started, the dubbing speed is automatically adjusted.

According to the present invention, an information recording and playing back system further comprises a user interface with which a user can select a high dubbing speed or a low dubbing speed, in case that the user selects the low dubbing speed, the system does not suspend the recording and playing back of said AV information for the first recording and playing back apparatus that is recording and playing back, and does not stop requests for recording and playing back after this, and in case that the user selects the high dubbing speed, the system suspends the playing back of said AV information for the first recording and playing back apparatus that is recording and playing back, and stops requests for playing back after this, and the dubbing of the AV information is performed corresponding to the slower transferring rate.

Consequently, when the user requires a high speed dubbing, the user can suspend the playing back operation of the first recording and playing back apparatus or stop a playing back request during the dubbing operation. Therefore, the high speed dubbing can be performed.

According to the present invention, an information recording and playing back system further comprises a remaining time displaying apparatus that calculates remaining time until the dubbing is finished by using the slower transferring rate obtained from said comparator being the actual dubbing speed and the remaining amount of the AV information to be dubbed, and informs the user the remaining time until the dubbing is finished.

Consequently, the user can recognize in real time the remaining dubbing time of the currently performing dubbing operation at the operating state of the first recording and playing back apparatus.

BRIEF DESCRIPTION OF THE DRAWINGS

The objects and features of the present invention will become more apparent from the consideration of the following detailed description taken in conjunction with the accompanying drawings in which:

FIG. 2 is a block diagram showing a first embodiment of the present invention;

FIG. 5 is a block diagram showing a fourth embodiment of the present invention.

DESCRIPTION OF THE PREFERRED EMBODIMENTS

Figure 1:
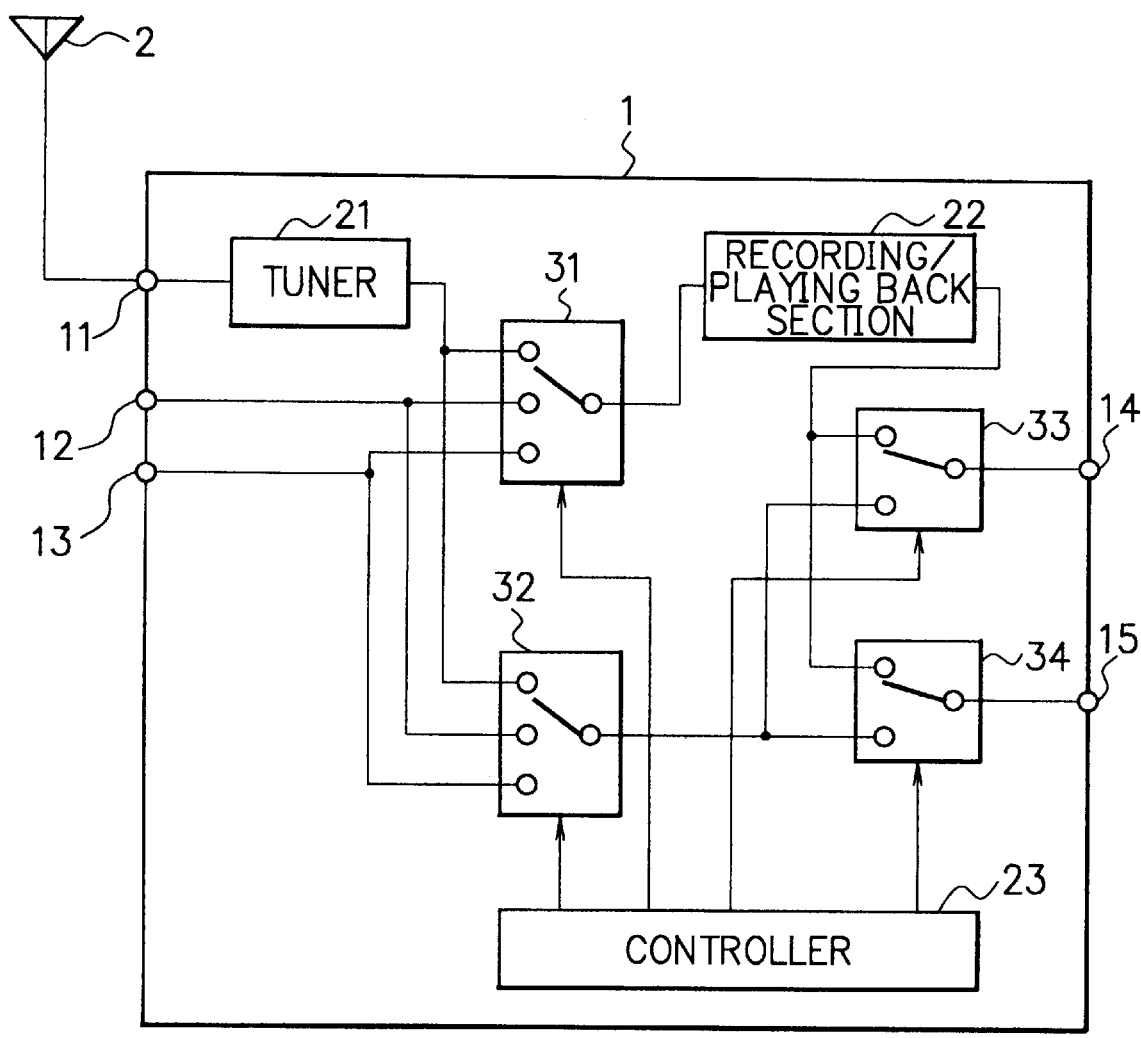
FIG. 1 is a block diagram showing a conventional apparatus.

Referring now to the drawings, embodiments of the present invention are explained in detail. FIG. 2 is a block diagram showing a first embodiment of the present invention. As shown in FIG. 2, an information recording and playing back system of the present invention consists of a first recording and playing back apparatus 501, a second recording and playing back apparatus 502 and a cable 503 connecting both the first and second recording and playing back apparatuses 501 and 502. In order to make explanations concise, the system is explained in a combined state of the both apparatuses. In this, actually these two apparatuses can be combined as one apparatus.

The first embodiment of the information recording and playing back system of the present invention shown in FIG. 2 consists of a first recording/playing back section 101 that can record and play back AV information of plural channels at the same time, encoders 102 and 202, decoders 103 and 203, recording/playing back controllers 104 and 204, a first transferring rate detecting section 105, a second recording/playing back section 201 that can record and play back AV information, a second transferring rate detecting section 205, external output terminals 301, tuners 302, external input terminals 303, a comparator 304, a dubbing controller 305 and a display 309.

The dubbing controller 305 provides a dubbing speed controller 306 inside the dubbing controller 305. The display 309 provides a dubbing AV information selector 310 inside the display 309.

The first recording/playing back section 101 is a high speed instrument such as a HD, and records a plurality of AV information encoded to, for example, MPEG 2 at the encoder 102 inputted from the tuners 302 and the external input terminals 303 at the same time of encoding, by controlled by the recording/playing back controller 104 based on a recording request by a user and a recording request reserved beforehand. In this, when the encoder is not needed, the encoder is omitted, and that the information is encoded at the same time means that it is the same time for the user, actually the information is encoded in high speed by time division.

And the first recording/playing back section 101 outputs the recorded plural AV data such as TV programs decoded at the decoder 103 to the external output terminals 301, controlled by the recording/playing back controller 104 based on a playing back request by a user. In this, when the decoder is not needed, the encoder is omitted. The output to the external output terminals 301 is watched by users through television sets (TV) (not shown). This operation is defined as a normal recording/playing back state of the first recording/playing back section 101.

When a user requires dubbing operation, the user requests the dubbing at the dubbing AV information selector 310 in the display 309, and the requested AV information selected by the user is informed to the dubbing speed controller 306 in the dubbing controller 305. And the dubbing operation is started. In this, the display 309 may be composed of a displaying terminal such as a TV set, and the request of the user may be inputted by its remote control unit.

The first transferring rate detecting section 105 detects a usable remaining transferring rate of the first recording/playing back section 101 that is operating in the normal recording/playing back state, and informs the detected usable remaining transferring rate to the comparator 304.

On the other hand, the second transferring rate detecting section 205 detects a usable transferring rate of the second recording/playing back section 201, and informs the detected usable transferring rate to the comparator 304.

The comparator 304 informs a slower one from the compared the two transferring rates to the dubbing speed controller 306 in the dubbing controller 305.

The dubbing speed controller 306 makes the first recording/playing back section 101 play back the requested AV information corresponding to the informed slower transferring rate, and if necessary, the played back information is decoded at the decoder 103. And further, corresponding to the informed slower transferring rate, if necessary, the played back information is encoded at the encoder 202 and is recorded at the second recording/playing back section 201 as the requested AV information. Consequently, the user can perform dubbing at the transferring rate as fast as possible, without considering the transferring rate that changes at the normal recording/playing back state of the first recording/playing back section 101.

Figure 3:
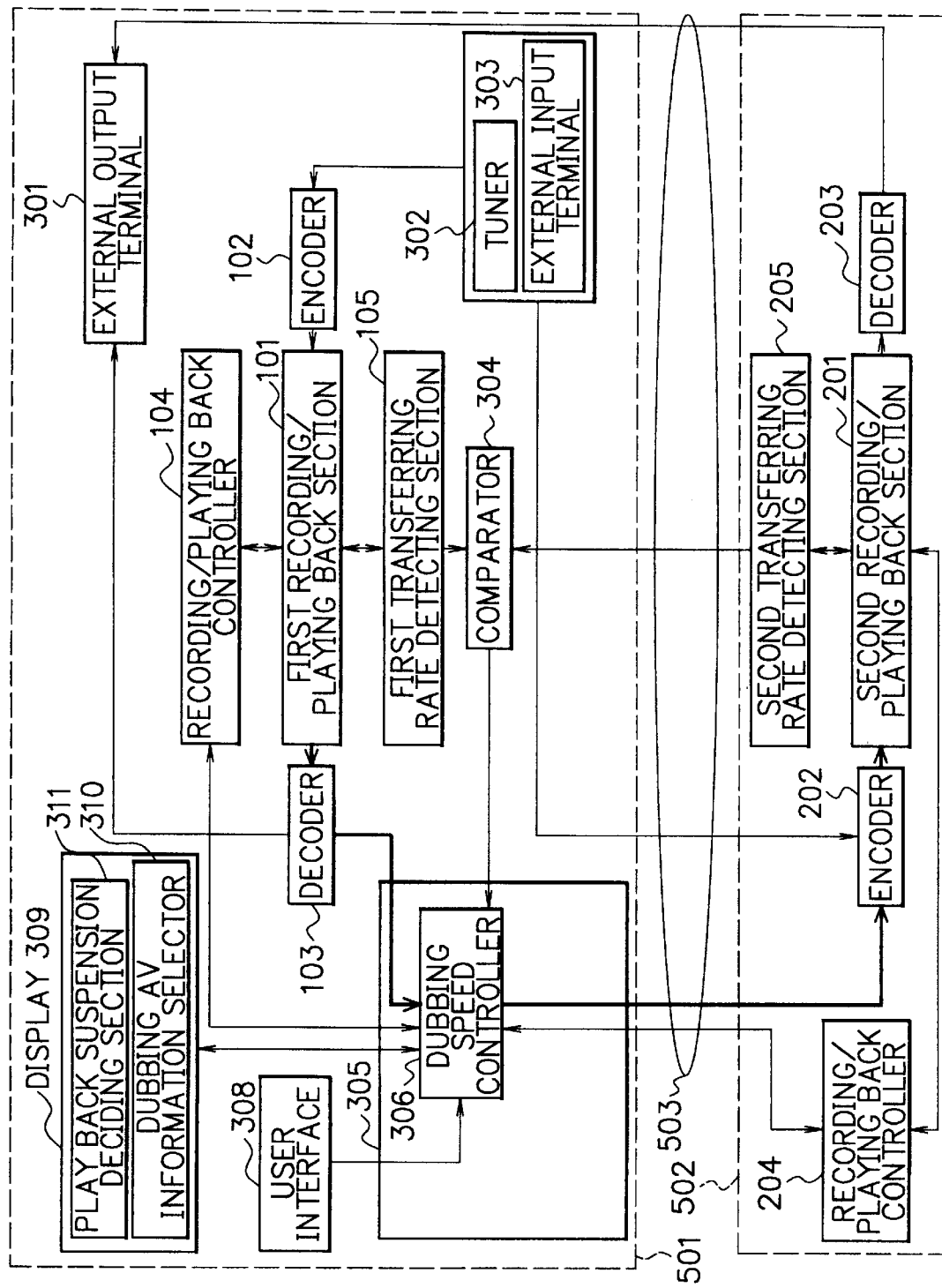
FIG. 3 is a block diagram showing a second embodiment of the present invention.

Next, a second embodiment of the present invention is explained. FIG. 3 is a block diagram showing the second embodiment of the present invention.

As shown in FIG. 3, the second embodiment of the information recording and playing back system of the present invention newly provides a user interface 308 with which a user can select a high or low speed dubbing mode and a play back suspension deciding section 311 in the display 309, in addition to the constitution of the first embodiment. By using this play back suspension deciding section 311, a user can suspend the playing back operation, under the condition that the dubbing can be automatically performed at the transferring rate as fast as possible at the first embodiment. With this, the user can select a low speed dubbing or a high speed dubbing, therefore the convenience for user is increased.

The user interface 308 informs a dubbing mode selected by the user, whether the dubbing mode is a high speed or a low speed, to the dubbing speed controller 306.

In case that the informed dubbing mode is a high speed, when a playing back operation currently exists at the first recording/playing back section 101, the dubbing speed controller 306 makes the play back suspension deciding section 311 display the suspension of the playing back operation and the user recognizes the suspension on the display. Upon the decision of the user, the dubbing speed controller 306 makes the current playing back operation at the first recording/playing back section 101 suspend via the recording/playing back controller 104.

At the same time, when a new playing back request occurs for the first recording/playing back section 101, the dubbing speed controller 306 stops this new playing back request via the recording/playing back controller 104. With this, it can be prevented that the transferring rate of the first recording/playing back section 101 becomes slower caused by the playing back operation. In this, with the approval of the user, the new playing back request can be accepted, but the new playing back request is not automatically accepted in case that the high speed dubbing is not selected.

In case that the informed dubbing mode is a low speed, the dubbing speed controller 306 does not interferes in the normal recording/playing back state of the first recording/playing back section 101.

At the second embodiment added the new functions to the first embodiment, in case that the transferring rate of the first recording/playing back section 101 restricts the dubbing speed, the dubbing speed can be increased by suspending the playing back operation with the selection of the high speed dubbing mode. And when the low speed dubbing is selected, the dubbing can be performed, for example, through the night, by keeping the normal recording/playing back state of the first recording/playing back section 101 and utilizing the remaining transferring rate effectively.

Figure 4:
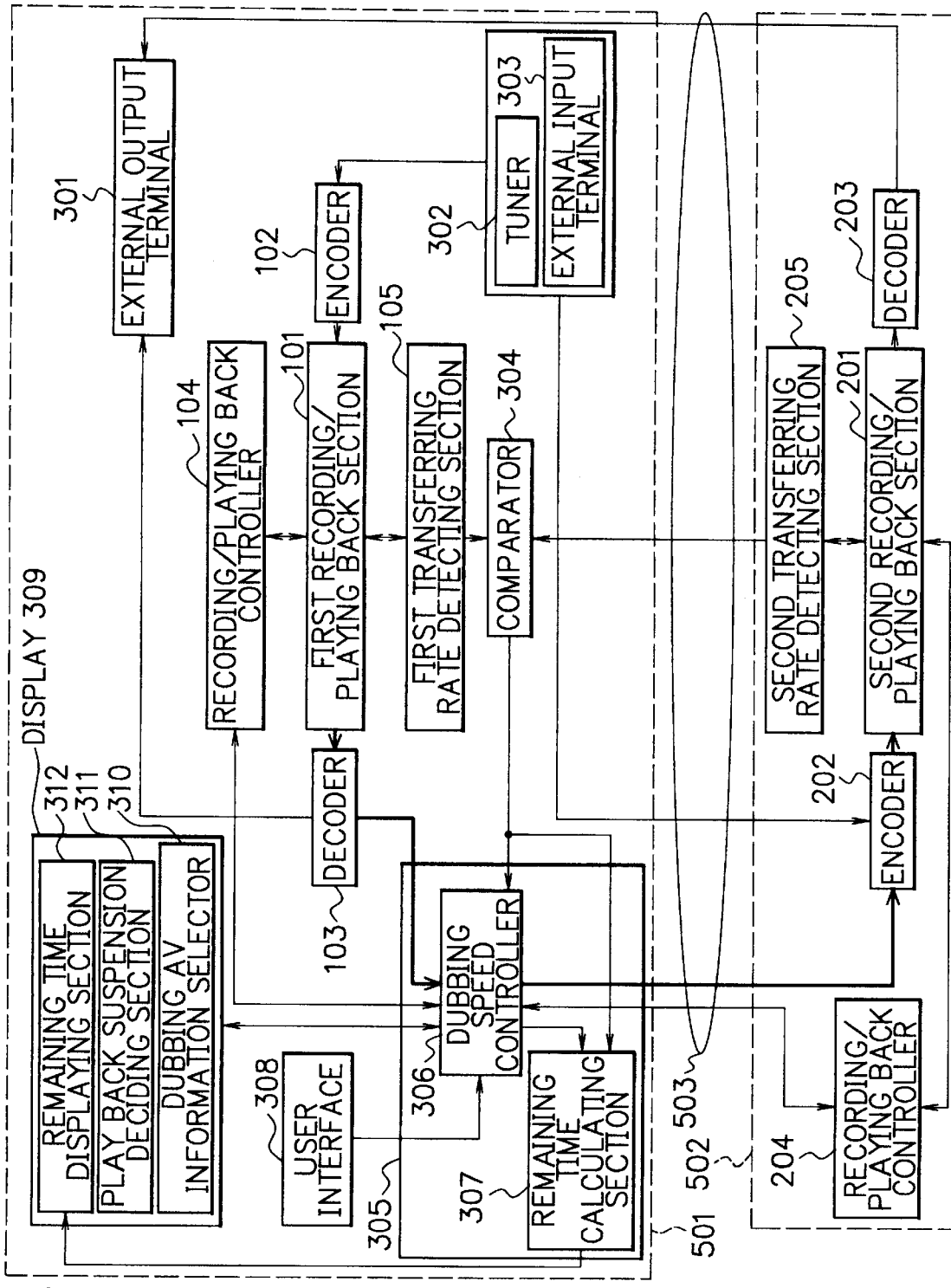
FIG. 4 is a block diagram showing a third embodiment of the present invention.

Next, a third embodiment of the present invention is explained. FIG. 4 is a block diagram showing the third embodiment of the present invention.

As shown in FIG. 4, the third embodiment of the information recording and playing back system of the present invention newly provides a remaining time calculating section 307 in the dubbing controller 305 and a remaining time displaying section 312 in the display 309, in addition to the constitution of the second embodiment. With this, the user is informed the remaining time until the dubbing is finished, therefore the convenience for user is further increased.

The remaining time calculating section 307 calculates the remaining time until the dubbing is finished, dividing the remaining amount to be dubbed of the requested AV information informed from the recording/playing back controller 104 via the dubbing speed controller 306, by the slower transferring rate in the first recording/playing back section 101 and the second recording/playing back section 201 informed from the comparator 304.

The remaining time calculating section 307 informs the calculated time until the dubbing is finished, which changes at every moment in the normal recording/playing back state of the first recording/playing back section 101, to the remaining time displaying section 312 in the display 309, and the remaining time is displayed.

Consequently, the user can recognize the time until the dubbing is finished, which changes at every moment at the normal recording/playing back state.

Referring to FIG. 4, the operation of the third embodiment of the present invention is explained in detail.

The user selects a requiring AV information at the dubbing AV information selector 310 in the display 309 and informs the start of the dubbing to the dubbing speed controller 306. The first transferring rate detecting section 105 detects the usable remaining transferring rate of the first recording/playing back section 101 that is working at the normal recording/playing back state, and informs the detected result to the comparator 304. On the other hand, the second transferring rate detecting section 205 detects the usable transferring rate of the second recording/playing back section 201, and informs the detected result to the comparator 304. And the remaining time calculating section 307 calculates the remaining time until the dubbing is finished, dividing the remaining amount to be dubbed of the requested AV information informed from the recording/playing back controller 104 via the dubbing speed controller 306, by the slower transferring rate in the first recording/playing back section 101 and the second recording/playing back section 201 informed from the comparator 304. And the remaining time calculating section 307 informs the calculated result to the remaining time displaying section 312 in the display 309, and the remaining time is displayed.

The user selects the dubbing mode whether the dubbing mode is made to be a high speed or a low speed by referring to the displayed remaining time until the dubbing is finished. The selected dubbing mode is informed to the dubbing speed controller 306.

In case that the informed dubbing mode is a high speed, when a playing back operation currently exists at the first recording/playing back section 101, the dubbing speed controller 306 makes the play back suspension deciding section 311 display the suspension of the playing back operation. When the user approves the suspension of this playing back operation, the dubbing speed controller 306 makes the current playing back operation at the first recording/playing back section 101 suspend via the recording/playing back controller 104. At the same time, when a new playing back request occurs for the first recording/playing back section 101, the dubbing speed controller 306 stops this new playing back request via the recording/playing back controller 104. With this, it can be prevented that the transferring rate of the first recording/playing back section 101 becomes slower caused by the playing back operation. And when the user does not approve the suspension of the playing back operation, the dubbing speed controller 306 displays that the dubbing operation is performed by the low speed mode at the play back suspension deciding section 311, with this the user can recognize the playing back operation of the low speed mode.

After completed the operation mentioned above, the third embodiment follows the same operation at the first embodiment. The dubbing speed controller 306 makes the first recording/playing back section 101 play back the required AV information corresponding to the slower transferring rate, and if necessary the played back AV information is decoded at the decoder 103. In this, the comparator 304 compares the usable remaining transferring rate of the first recording/playing back section 101 and the usable transferring rate of the second recording/playing back section 201, and outputs the compared result to the first recording/playing back section 101. And further, the required AV information, if necessary, is encoded at the encoder 202 corresponding to the informed slower transferring rate and is recorded in the second recording/playing back section 201.

Consequently, the user can perform dubbing at the transferring rate as fast as possible, without considering the transferring rate that changes at the normal recording/playing back state of the first recording/playing back section 101, that is, for example, even at the case that recording operation occurs by the reserved recording during the dubbing operation.

And at the high speed mode, the playing back operation of the first recording/playing back section 101 is suspended, therefore, when the transferring rate of the first recording/playing back section 101 is a limit of the dubbing speed, the dubbing speed can be increased. This suspension of the first recording/playing back section 101 is cancelled at the same time of the completion of the dubbing.

In case that the informed dubbing mode is a low speed, the normal recording/playing back state of the first recording/playing back section 101 is not changed, corresponding to the first embodiment, the dubbing speed controller 306 makes the comparator 304 compare the usable remaining transferring rate of the first recording/playing back section 101 and the usable transferring rate of the second recording/playing back section 201, and makes the first recording/playing back section 101 play back the required AV information corresponding to the slower transferring rate and if necessary the played back information is decoded at the decoder 103. And further, the required AV information, if necessary, is encoded at the encoder 202 corresponding to the informed slower transferring rate and is recorded in the second recording/playing back section 201.

Consequently, the user can perform the dubbing at the transferring rate as fast as possible, without considering the transferring rate that changes by the normal recording/playing back state of the recording/playing back section 101, that is, even at the case that the recording operation occurs by the reserved recording during the dubbing operation of the first recording/playing back section 101. And at the low speed mode, the dubbing can be performed, for example, through the night, by keeping the normal recording/playing back state of the first recording/playing back section 101 and utilizing the remaining transferring rate effectively.

Even in the case that either of the high and low speed modes is selected, the remaining time calculating section 307 calculates the remaining time until the dubbing is finished, dividing the remaining amount to be dubbed of the requested AV information informed from the recording/playing back controller 104 via the dubbing speed controller 306, by the slower transferring rate in the first recording/playing back section 101 and the second recording/playing back section 201 informed from the comparator 304. And the remaining time calculating section 307 informs the calculated time until the dubbing is finished, which changes at every moment in the normal recording/playing back state of the first recording/playing back section 101, to the remaining time displaying section 312 in the display 309, and the remaining time is displayed. Consequently, the user can recognize the time until the dubbing is finished, which changes at every moment at the normal recording/playing back state.

Next, a fourth embodiment of the present invention is explained. FIG. 5 is a block diagram showing the fourth embodiment of the present invention.

As shown in FIG. 5, the fourth embodiment of the information recording and playing back system of the present invention has the same constitution as the third embodiment. However, as shown in FIG. 5, connecting lines among functions are different from the third embodiment shown in FIG. 4. At the fourth embodiment, a signal from the decoder 203 connected to the second recording/playing back section 201, to the dubbing speed controller 306 is transmitted by a connection line 401. And a signal from the dubbing speed controller 306 to the encoder 102 connected to the first recording/playing back section 101 is transmitted by a connection line 402. This connection can be easily applied in the case that the AV information is dubbed from the second recording/playing back section 201 to the first recording/playing back section 101.

Furthermore, a super high speed mode, with which further higher speed dubbing than at the high speed mode is performed, can be applied. And like as the suspension for the playing back, the suspension for the recording at the first recording/playing back section 101 can be applied. In this case, the time until the dubbing is finished is informed to the user, therefore the user can judge, for example, whether the recording suspension state is cancelled or not until next reserved recording occurs after the dubbing is finished.

Moreover, at the embodiment mentioned above, the second recording/playing back section can record and play back the AV information, however, the second recording/playing back section can be set as the first recording/playing back section that can record and play back the AV information of plural channels at the same time.

And the second recording/playing back section can provide external output terminals and tuners.

As mentioned above, according to the present invention, the dubbing speed is restricted by the slower transferring rate in the usable transferring rates of the first recording/playing back section and the second recording/playing back section, therefore the dubbing can be performed at the usable transferring rate as fast as possible, without considering the transferring rate that changes at every moment in the normal recording/playing back state.

According to the present invention, in case that the dubbing speed is slow by the limit of the usable transferring rate of the first recording/playing back section, the user can increase the dubbing speed by selecting the high speed dubbing mode and suspending the normal playing back operation.

According, to the present invention, the remaining time for the dubbing is calculated from the slower transferring rate being the dubbing speed and the remaining amount of the AV information to be dubbed. And the remaining time is displayed on the display. Therefore the user can recognize the time until the dubbing is finished, which changes every moment by the normal recording/playing back state of the first recording/playing back section.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An information recording and playing back system, which provides a first recording and playing back apparatus that can records and play back audio and video (AV) information of plural channels at the same time and a second recording and playing back apparatus, which is built-in or set outside said system, can record and play back said AV information from said first recording and playing back apparatus, can perform dubbing of required AV information from said first recording and playing back apparatus to said second recording and playing back apparatus, comprising:

a first transferring rate detecting means for detecting a usable transferring rate of said first recording and playing back apparatus;

a second transferring rate detecting means for detecting a usable transferring rate of said second recording and playing back apparatus; and a comparator that compares detected two transferring rates and outputs a slower transferring rate, wherein:

said dubbing of AV information is performed corresponding to said slower transferring rate.

2. An information recording and playing back system in accordance with claim 1, further comprising:

a user interface with which a user can select a high dubbing speed or a low dubbing speed, wherein:

in case that the user selects the low dubbing speed, the system does not suspend the recording and playing back of said AV information for the first recording and playing back apparatus that is recording and playing back, and does not stop requests for recording and playing back after this, in case that the user selects the high dubbing speed, the system suspends the playing back of said AV information for the first recording and playing back apparatus that is recording and playing back, and stops requests for playing back after this, and the dubbing of the AV information is performed corresponding to the slower transferring rate.

3. An information recording and playing back system in accordance with claim 1, further comprising:

a remaining time displaying apparatus that calculates remaining time until the dubbing is finished by using the slower transferring rate obtained from said comparator being the actual dubbing speed and the remaining amount of the AV information to be dubbed, and informs the user the remaining time until the dubbing is finished.

4. An information recording and playing back system in accordance with claim 2, further comprising:

a remaining time displaying apparatus that calculates remaining time until the dubbing is finished by using the slower transferring rate obtained from said comparator being the actual dubbing speed and the remaining amount of the AV information to be dubbed, and informs the user the remaining time until the dubbing is finished.

5. An information recording and playing back system in accordance with claim 1, wherein:

said second recording and playing back apparatus can record and play back AV information of plural channels at the same time.

6. An information recording and playing back system in accordance with claim 1, wherein:

dubbing of AV information from said second recording and playing back apparatus to said first recording and playing back apparatus can be performed.

7. An information recording and playing back method, in which dubbing of a required AV information is performed from a first recording and playing back apparatus that can records and play back AV information of plural channels at the same time to a second recording and playing back apparatus that can record and play back AV information, comprising the steps of:

detecting a usable transferring rate of said first recording and playing back apparatus; and detecting a usable transferring rate of said second recording and playing back apparatus, wherein:

dubbing of AV information is performed corresponding to a slower transferring rate in the comparison of said detected two transferring rates.

8. An information recording and playing back method in accordance with claim 7, wherein:

in case that a user selects a low speed dubbing, the recording and playing back of said AV information for the first recording and playing back apparatus that is recording and playing back is not suspended, and requests for recording and playing back after this are not stopped, in case that a user selects a high speed dubbing, the playing back of said AV information for the first recording and playing back apparatus that is recording and playing back is suspended, and requests for playing back after this is stopped, and the dubbing of the AV information is performed corresponding to the slower transferring rate.

9. An information recording and playing back method in accordance with claim 7, further comprising the steps of:

calculating remaining time until the dubbing is finished by using the slower transferring rate obtained from said comparator being the actual dubbing speed and the remaining amount of the AV information to be dubbed; and informing the user the remaining time until the dubbing is finished.

10. An information recording and playing back method in accordance with claim 8, further comprising the steps of:

calculating remaining time until the dubbing is finished by using the slower transferring rate obtained from said comparator being the actual dubbing speed and the remaining amount of the AV information to be dubbed; and informing the user the remaining time until the dubbing is finished.

11. An information recording and playing back method in accordance with claim 7, wherein:

said second recording and playing back apparatus can record and play back AV information of plural channels at the same time.

12. An information recording and playing back method in accordance with claim 7, wherein:

dubbing of AV information from said second recording and playing back apparatus to said first recording and playing back apparatus can be performed.

\* \* \* \* \*